United States Patent
Kikuchi et al.

(10) Patent No.: US 8,653,742 B2
(45) Date of Patent: Feb. 18, 2014

(54) CONTROL CIRCUIT OF SWITCHING POWER SUPPLY FOR DRIVING LIGHT EMITTING ELEMENTS, AND LIGHT EMITTING DEVICE AND ELECTRONIC APPARATUS USING THE SAME

(75) Inventors: Hiroki Kikuchi, Kyoto (JP); Jung-Nam In, Seoul (KR); Min-Ki Ahn, Seoul (KR)

(73) Assignee: Rohm Co., Ltd. (JP)

( * ) Notice: Subject to any disclaimer, the term of this patent is extended or adjusted under 35 U.S.C. 154(b) by 154 days.

(21) Appl. No.: 13/413,928

(22) Filed: Mar. 7, 2012

(65) Prior Publication Data

US 2012/0229045 A1 Sep. 13, 2012

(30) Foreign Application Priority Data

Mar. 8, 2011 (JP) .................................. 2011-050735

(51) Int. Cl.
*H05B 37/02* (2006.01)
(52) U.S. Cl.
USPC ......... 315/224; 315/209 R; 315/291; 315/307
(58) Field of Classification Search
USPC .......... 315/224, 225, 209 R, 185 R, 186, 291, 315/302, 307, 313
See application file for complete search history.

(56) References Cited

U.S. PATENT DOCUMENTS

| 7,952,299 B2 * | 5/2011 | Iwasaki ......................... 315/291 |
| 8,492,982 B2 * | 7/2013 | Hagino et al. ............. 315/185 R |
| 2011/0083028 A1 * | 4/2011 | Jung ............................. 713/323 |

FOREIGN PATENT DOCUMENTS

| JP | 2006-114324 A | 4/2006 |
| JP | 2006-339298 A | 12/2006 |
| JP | 2007-158083 A | 6/2007 |
| JP | 2008-64477 A | 3/2008 |
| JP | 2008-258428 A | 10/2008 |
| JP | 2008-300208 A | 12/2008 |

* cited by examiner

*Primary Examiner* — James H Cho
(74) *Attorney, Agent, or Firm* — Cantor Colburn LLP (57) ABSTRACT

A control circuit of a switching power supply for supplying a drive voltage to a light emitting element is provided. The control circuit includes a pulse width modulator which generates a pulse signal whose duty ratio is adjusted such that a detection voltage corresponding to an output voltage of the switching power supply is equal to a predetermined reference voltage, a driver which drives a switching element of the switching power supply based on the pulse signal, and a standby control unit which stops driving of the switching element once a predetermined time has passed after a standby signal steps down to a level indicating a standby state, and to shut down the control circuit and a current source.

8 Claims, 6 Drawing Sheets

CONTROL CIRCUIT OF SWITCHING POWER SUPPLY FOR DRIVING LIGHT EMITTING ELEMENTS, AND LIGHT EMITTING DEVICE AND ELECTRONIC APPARATUS USING THE SAME

CROSS-REFERENCE TO RELATED APPLICATION

This application is based upon and claims the benefit of priority from Japan Patent Application(s) No. 2011-50735, filed on Mar. 8, 2011, the entire contents of which are incorporated herein by reference.

TECHNICAL FIELD

The present disclosure relates to a light emitting device.

BACKGROUND

Figure 1:
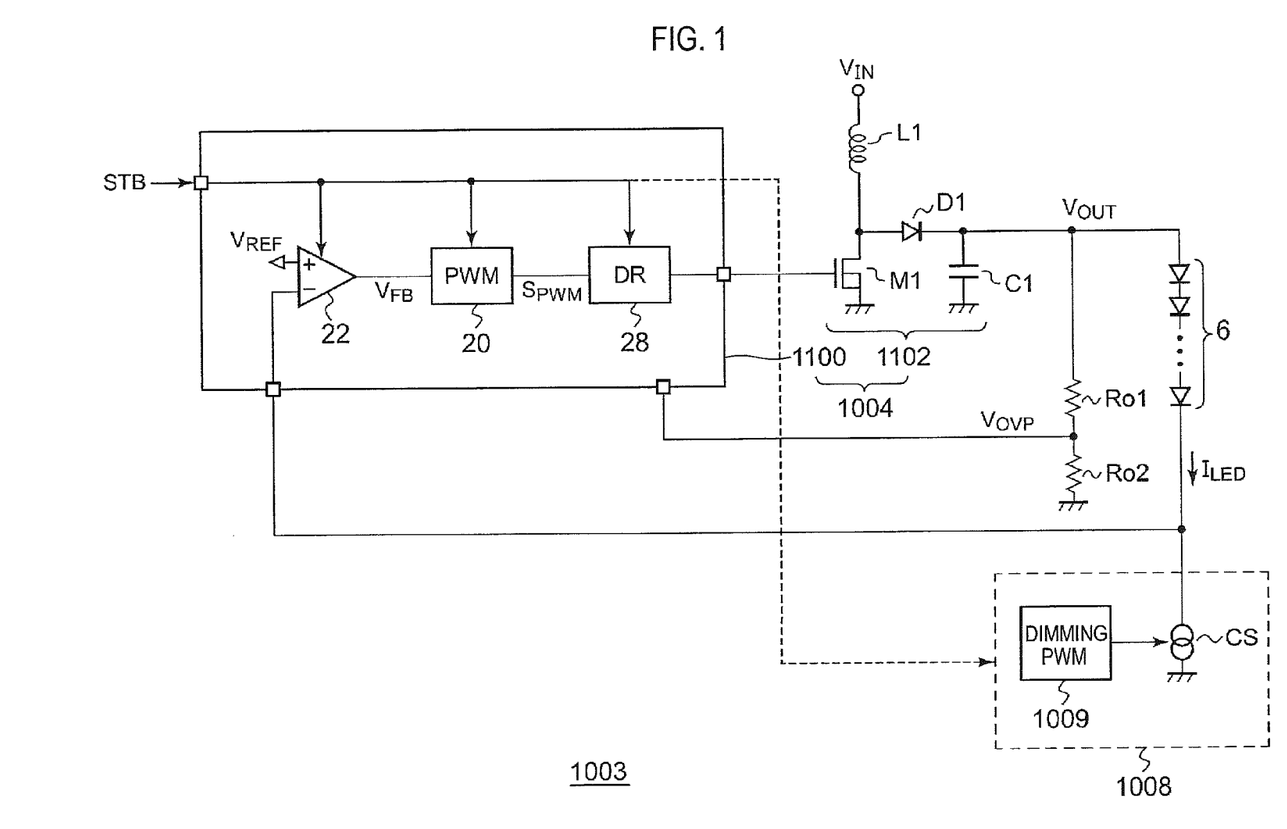
FIG. 1 is a circuit diagram illustrating a configuration of a light emitting device according to some embodiments of the present disclosure.

Recently, a light emitting device using light emitting elements such as light emitting diodes (LEDs) is used as a backlight of a liquid crystal panel and lighting equipment. FIG. 1 is a circuit diagram illustrating a configuration of a light emitting device 1003. The light emitting device 1003 and its operation to be described below are not considered as conventional technology by the present applicant. The light emitting device 1003 includes an LED string 6, a switching power supply 1004 and a current driver circuit 1008.

The LED string 6 includes a plurality of LEDs which are connected in series. The switching power supply 1004 steps up an input voltage $V_{IN}$ to supply a drive voltage $V_{OUT}$ to one end of an anode side of the LED string 6.

The current driver circuit 1008 adjusts luminance of the LED string 6 using a combination of analog dimming and burst dimming (also referred to as PWM dimming). A current source CS is connected to one end of a cathode side of the LED string 6 to supply a drive current $I_{LED}$ to the LED string 6 according to target luminance. The dimming based on a magnitude of the drive current $I_{LED}$ is referred to as analog dimming.

A PWM controller 1009 intermittently turns on the current source CS at a duty ratio according to the burst dimming. Accordingly, the drive current $I_{LED}$ flows through the LED string 6 only during an ON period $T_{ON}$ according to the duty ratio, so that the time average of the drive current $I_{LED}$ is controlled and the luminance is adjusted.

The switching power supply 1004 includes an output circuit 1102 and a control integrated circuit (IC) 1100. The output circuit 1102 includes an inductor L1, a switching transistor M1, a rectifier diode D1 and an output capacitor C1. The control IC 1100 adjusts the drive voltage $V_{OUT}$ by controlling a duty ratio of ON/OFF of the switching transistor M1.

The control IC 1100 stabilizes the drive voltage $V_{OUT}$ such that a voltage between both ends of the current source CS. That is, a potential (referred to as a detection voltage) $V_{LED}$ of one end of the cathode side of the LED string 6 is equal to a reference voltage $V_{REF}$. An error amplifier 22 amplifies an error of the detection voltage $V_{LED}$ and the reference voltage $V_{REF}$, and generates a feedback voltage $V_{FB}$. A pulse width modulator PWM generates a pulse signal $S_{PWM}$ having a duty ratio according to the feedback voltage $V_{FB}$. A driver DR drives the switching transistor M1 based on the pulse signal $S_{PWM}$.

The drive voltage $V_{OUT}$ is divided by resistors Ro1 and Ro2, and input to the control IC 1100. The control IC 1100 detects an over-voltage state or the like by using the divided drive voltage $V_{OUT}$ (hereinafter referred to as OVP voltage $V_{OVP}$).

A standby signal STB is inputted to the control IC 1100 from a microcomputer. The control IC 1100 turns on the LED string 6 by the above-mentioned operation when the standby signal STB reaches a first level (e.g., high level), and turns off the LED string 6 by turning off the current source CS while stopping the switching transistor M1 when the standby signal STB becomes a second level (e.g., low level).

Figure 2:
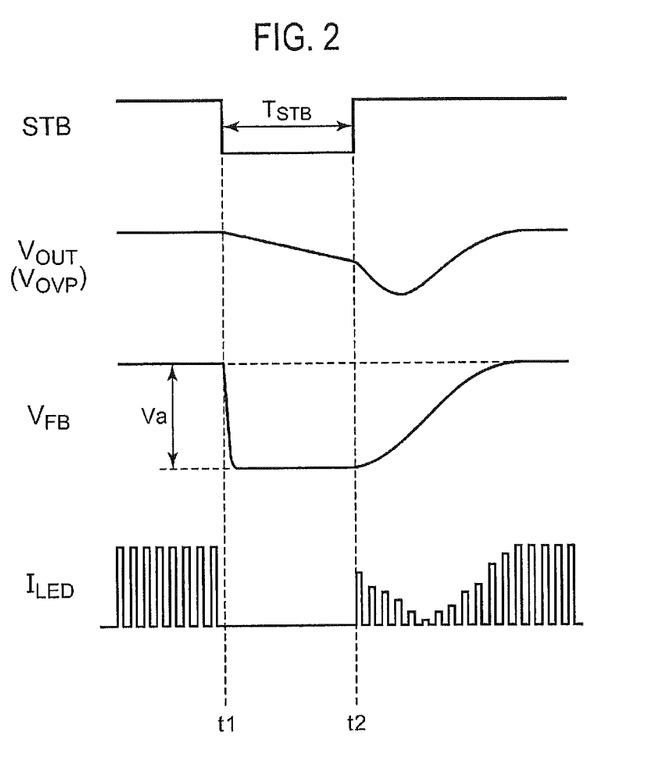
FIG. 2 is a waveform diagram illustrating an operation of the light emitting device of FIG. 1.

FIG. 2 is a waveform diagram illustrating an operation of the light emitting device 1003 of FIG. 1. Prior to a time t1, the standby signal STB is set at a high level. At this time, the output voltage $V_{OUT}$ is stabilized to a predetermined level, and the drive current $I_{LED}$ flows in the LED string 6. Further, the feedback voltage $V_{FB}$ is also kept in the vicinity of a certain voltage level Va. If the detection voltage $V_{LED}$ is larger than the reference voltage $V_{REF}$, the feedback voltage $V_{FB}$ is lowered and the ON period of the switching transistor M1 is shortened, so that feedback is applied to reduce the drive voltage $V_{OUT}$. On the other hand, if the detection voltage $V_{LED}$ is smaller than the reference voltage $V_{REF}$, the feedback voltage $V_{FB}$ increases, so that feedback is applied to shorten the ON time of the switching transistor M1.

At the time t1, the standby signal STB steps down to a low level. Accordingly, internal circuit blocks of the control IC 1100, such as a PWM (pulse width modulator) 20, the error amplifier 22 and a driver 28, are shut down, and switching of the switching transistor M1 is stopped. Further, if the standby signal STB is set at a low level, applying of the current source CS to the light emitting device 1003 is also stopped.

If the switching of the switching transistor M1 is stopped, charges of the output capacitor C1 are discharged through the resistors Ro1 and Ro2, and the drive voltage $V_{OUT}$ is reduced slowly. Further, the feedback voltage $V_{FB}$ output from the error amplifier 22 is reduced substantially to a ground voltage of 0 V by the shutdown of the error amplifier 22.

At time t2, the standby signal STB steps up to a high level. Accordingly, the control IC 1100 returns to an operation state from a standby state, and the operation of the internal circuit blocks is resumed. If a standby period $T_{STB}$ is not too long, as the drive voltage $V_{OUT}$ at the time t2 maintains a sufficiently high level, the drive current $I_{LED}$ flows in the LED string 6 to emit light.

At the time t2, the drive voltage $V_{OUT}$ is lower than a target value, and the detection voltage $V_{LED}$ is lower than the reference voltage $V_{REF}$. Accordingly, in order to increase the detection voltage $V_{LED}$, it is necessary to apply feedback to lengthen the ON time of the switching transistor M1. However, since the feedback voltage $V_{FB}$ is reduced to 0 V, although the detection voltage $V_{LED}$ is lower than the reference voltage $V_{REF}$, the ON time of the switching transistor M1 becomes shorter, so that feedback is applied to further reduce the detection voltage $V_{LED}$. Accordingly, the drive current $I_{LED}$ is reduced. Then, the feedback voltage $V_{FB}$ approaches the original voltage level Va, and the detection voltage $V_{LED}$ also returns to its original level.

As described above, in the light emitting device 1003 of FIG. 1, when returning from the standby state, the LED string 6 emits light, and after light emission intensity is reduced, the LED string 6 emits light at target intensity. This is undesirable because it appears as flickering of the LED string 6.

SUMMARY

In view of the above, the present disclosure provides suppression of flicker when returning from a standby state.

According to one aspect of the present disclosure, provided is a control circuit of a switching power supply for supplying a drive voltage to one end of a light emitting element which is constant-current driven by a current source. The control circuit includes a pulse width modulator which generates a pulse signal whose duty ratio is adjusted such that a detection voltage corresponding to an output voltage of the switching power supply is equal to a predetermined reference voltage. The control circuit further includes a driver which drives a switching element of the switching power supply based on the pulse signal, and a standby control unit which stops driving of the switching element once a predetermined time has passed after a standby signal steps down to a level indicating a standby state, and to shut down the control circuit and a current source.

After the transition to the standby state, until a predetermined time has elapsed, while the switching transistor is stopped, the current source connected to the light emitting element continuously operates. Consequently, charges of the output capacitor of the switching power supply may be discharged through the light emitting element, thereby reducing the output voltage. Accordingly, it is possible to suppress the light emitting element from emitting light immediately after the next transition to the operation state from the standby state.

The control circuit with this configuration may further include an internal power supply. An output terminal of the control circuit is connected to a capacitor, and the control circuit stabilizes a voltage generated at the output terminal in an operation state to a predetermined level and supplies the voltage to the driver. The standby control unit includes a logic unit which sets the internal power supply in a stop state if the standby signal is transited to the level indicating the standby state, a discharge circuit which is connected to the output terminal of the internal power supply, and a comparator which compares a potential of the output terminal of the internal power supply with a predetermined threshold voltage. At least a portion of circuit blocks of the control circuit may be shut down according to an output of the comparator. According to this embodiment, the internal power supply may be used as a timer circuit for measuring a predetermined time.

According to another aspect of the present disclosure, provided is a control circuit of a switching power supply for supplying a drive voltage to one end of a light emitting element which is constant-current driven. The control circuit includes a pulse width modulator, a driver, a discharge circuit and a standby control unit. The pulse width modulator generates a pulse signal whose duty ratio is adjusted such that a detection voltage corresponding to an output voltage of the switching power supply is equal to a predetermined reference voltage. The driver drives a switching element of the switching power supply based on the pulse signal. The discharge circuit includes a discharge path provided between the one end of the light emitting element and a ground terminal, and is configured such that the discharge path is conducted if a standby signal is transited to a level indicating a standby state. The standby control unit shuts down the control circuit when the standby signal is transited to the level indicating the standby state.

According to this embodiment, after the transition to the standby state, charges of the output capacitor of the switching power supply may be discharged through the discharge circuit, thereby reducing the output voltage. Accordingly, it is possible to suppress the light emitting element from emitting light immediately after the next transition to the operation state from the standby state.

According to still another aspect of the present disclosure, provided is a light emitting device including a light emitting element, a switching power supply which supplies a drive voltage to one end of the light emitting element, and a current driver circuit which is connected to the other end of the light emitting element, and supplies a drive current corresponding to target luminance to the light emitting element. The switching power supply contains an output circuit including a switching element and any one of the above-described control circuits and configured to drive the switching element.

According to still another aspect of the present disclosure, provided is an electronic apparatus including a liquid crystal panel, and the above-described light emitting device and provided as a backlight of the liquid crystal panel.

Further, replacement of any combination of the above components, or components and expressions of the present disclosure in a method, apparatus, system and the like may be effective as an embodiment of the present disclosure.

According to the above aspects of the present disclosure, the flicker may be suppressed from the standby state to the return time.

DETAILED DESCRIPTION

Reference will now be made in detail to various embodiments, examples of which are illustrated in the accompanying drawings. In the following detailed description, numerous specific details are set forth in order to provide a thorough understanding of the present invention(s). However, it will be apparent to one of ordinary skill in the art that the present invention(s) may be practiced without these specific details. In other instances, well-known methods, procedures, systems, and components have not been described in detail so as not to unnecessarily obscure aspects of the various embodiments. The same reference numerals are assigned to the same or equivalent components shown in each drawing, and a repeated description will be omitted. All features described in the embodiments or a combination thereof is not necessarily essential in the invention.

As used herein, the term "state where member A is connected to member B" includes, in addition to a case where the member A and member B are physically directly connected, a case where the member A and member B are indirectly connected without substantially affecting their electrical connection state, without impairing a function or effect exerted by their combination, or via any other member.

Similarly, the term "state where member C is provided between member A and member B" includes, in addition to a case where the member A and member C or the member B and member C are directly connected, a case where the member A and member C or the member B and member C are indirectly connected without substantially affecting their electrical connection state, without impairing a function or effect exerted by their combination, or via any other member.

Figure 3:
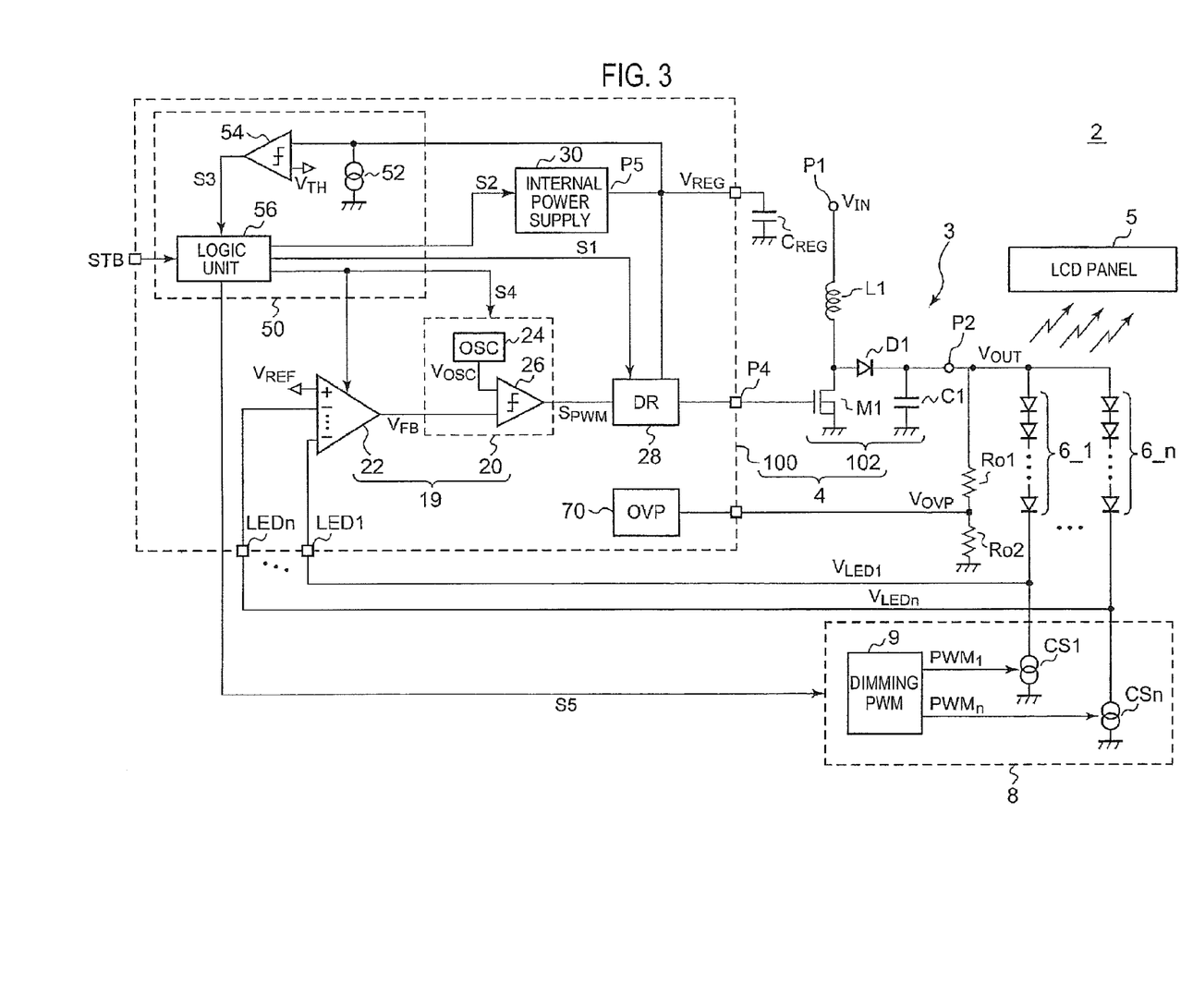
FIG. 3 is a circuit diagram illustrating a configuration of an electronic apparatus including a switching power supply according to some embodiments of the present disclosure.

FIG. 3 is a circuit diagram illustrating a configuration of an electronic apparatus including a switching power supply according to some embodiments of the present disclosure.

An electronic apparatus 2 is a battery-driven apparatus such as a laptop computer, a digital camera, a digital video camera, a mobile phone, and a personal digital assistant (PDA). The electronic apparatus 2 includes a light emitting device 3 and a liquid crystal display (LCD) panel 5. The light emitting device 3 is installed as a backlight of the LCD panel 5.

The light emitting device 3 includes light emitting elements LED strings 6_1 to 6_n, a current driver circuit 8, and a switching power supply 4.

Each of the LED strings 6 includes a plurality of LEDs which are connected in series. The switching power supply 4 is a step-up DC/DC converter, and steps up an input voltage (e.g., battery voltage) $V_{IN}$ input to an input terminal P1 to generate an output voltage (drive voltage) $V_{OUT}$ in an output line connected to an output terminal P2. One end (anode) of each of the LED strings 6_1 to 6_n is connected to the output line in common.

The switching power supply 4 includes a control integrated circuit (IC) 100 and an output circuit 102. The output circuit 102 includes an inductor L1, a rectifier diode D1, a switching transistor M1, and an output capacitor C1. Since topology of the output circuit 102 is general, a description thereof will be omitted. Further, it should be understood by those skilled in the art that there are various modifications in its topology, and it is not limited to the structure described in the present disclosure.

A switching terminal P4 of the control IC 100 is connected to a gate of the switching transistor M1. The control IC 100 adjusts a duty ratio of ON/OFF of the switching transistor M1 by feedback so as to obtain the output voltage $V_{OUT}$ required for turning on the LED strings 6. Further, the switching transistor M1 may be built in the control IC 100.

The current driver circuit 8 is connected to the other end (cathode) of each of the LED strings 6_1 to 6_n. The current driver circuit 8 supplies, each of the LED strings 6_1 to 6_n, intermittent or DC drive currents $I_{LED1}$ to $I_{LEDn}$ according to target luminance. Specifically, the current driver circuit 8 includes a plurality of current sources $CS_1$ to $CS_n$ respectively provided for the LED strings 6_1 to 6_n, and a PWM controller 9. For example, the i-th current source $CS_i$ is connected to the cathode of the corresponding i-th LED string 6_i. The current source $CS_i$ is configured to be switched between an operation (active) state $\phi_{ON}$ where the drive current $I_{LEDi}$ is output and a stop state $\phi_{OFF}$ where the applying of the drive current $I_{LEDi}$ is stopped according to a control signal $PWM_i$ output from the PWM controller 9. The PWM controller 9 generates control signals $PWM_1$ to $PWM_n$ having a duty ratio corresponding to the target luminance, and outputs the control signals to the current sources $CS_1$ to $CS_n$ respectively. During a period corresponding to an ON period $T_{ON}$, in which the control signal $PWM_i$ representing a high level is received, the corresponding current source $CS_i$ is in the operation state $\phi_{ON}$, and the LED string 6_i is turned on. During a period corresponding to an OFF period $T_{OFF}$, in which the control signal $PWM_i$ is negated, e.g., a low level, the corresponding current source $CS_i$ is in the stop state $\phi_{OFF}$, and the LED string 6_i is turned off. By controlling a time ratio of the ON period $T_{ON}$ to the OFF period $T_{OFF}$, an effective value (time average) of the drive current $I_{LED}$ flowing through the LED string 6_i is controlled. Accordingly, the luminance is adjusted and the flickers are suppressed. A PWM drive frequency of the current driver circuit 8 is several tens to several hundreds Hz.

The control IC 100 and the current driver circuit 8 are respectively integrated into separate chips as shown in FIG. 3. They may be configured as a single package (module) and separate packages. Alternatively, the control IC 100 and the current driver circuit 8 may be integrated into a single chip.

A configuration of the control IC 100 will now be described. The control IC 100 includes LED terminals $LED_1$ to $LED_n$ respectively provided for the LED strings 6_1 to 6_n. For example, a LED terminal $LED_i$ is connected to a cathode terminal of the corresponding LED string 6_i. Further, the number of the LED strings does not need to be more than one, and one LED string may be provided.

The control IC 100 mainly includes a pulse generating unit 19, a driver 28, an internal power supply 30, a standby control unit 50, and an over-voltage protection (OVP) circuit 70.

The pulse generating unit 19 generates a pulse signal $S_{PWM}$ whose duty ratio is adjusted such that a detection voltage corresponding to the output voltage $V_{OUT}$ is equal to a predetermined reference voltage $V_{REF}$ in the ON period $T_{ON}$ of the LED strings 6. In FIG. 3, the detection voltage is the lowest voltage among voltages (LED terminal voltages) $V_{LED1}$ to $V_{LEDn}$ generated at the cathode terminals of the LED strings 6, and hereinafter is referred to as $V_{LED}$. Further, in another embodiment, another voltage, e.g., a voltage $V_{OVP}$ obtained by dividing the output voltage $V_{OUT}$ may be used as the detection voltage.

The driver 28 drives the switching transistor M1 based on the pulse signal $S_{PWM}$. The internal power supply 30 stabilizes a voltage $V_{REG}$ generated at an output terminal P5 in the operation state to a predetermined level (e.g., 5 V), and supplies the voltage $V_{REG}$ to the driver 28. The driver 28 applies the voltage $V_{REG}$ to the gate of the switching transistor M1 when the pulse signal $S_{PWM}$ reaches a first level (e.g., high level), and applies a ground voltage VSS to the gate of the switching transistor M1 when the pulse signal $S_{PWM}$ becomes a second level (e.g., low level).

In the ON period $T_{ON}$, the control IC 100 adjusts the output voltage $V_{OUT}$ of the switching power supply 4 to an optimum voltage level for driving the LED strings 6_1 to 6_n. In the OFF period $T_{OFF}$, since the drive currents $I_{LED1}$ to $I_{LEDn}$ being supplied to the LED strings 6_1 to 6_n are zero, the switching power supply 4 is in a no-load state and the control IC 100 may set the switching transistor M1 in an OFF state. Subsequently, a configuration of the pulse generating unit 19 will be described according to some embodiments of the present disclosure.

The pulse generating unit 19 includes an error amplifier 22 and a PWM 20. The error amplifier 22 amplifies an error of the detection voltage $V_{LED}$ and the reference voltage $V_{REF}$ in the ON period of the LED strings 6, and generates a feedback voltage $V_{FB}$ according to the error.

Specifically, the error amplifier 22 has a plurality of inverting input terminals (−) and one non-inverting input terminal (+). The LED terminal voltages $V_{LED1}$ to $V_{LEDn}$ are respectively input to inverting input terminals, and the reference voltage $V_{REF}$ is input to non-inverting input terminal. The error amplifier 22 generates the feedback voltage $V_{FB}$ according to the error of the lowest LED terminal voltage (detection voltage) $V_{LED}$ and the reference voltage $V_{REF}$.

The PWM 20 includes a pulse width modulator, and generates the pulse signal $S_{PWM}$ having a fixed period and a duty ratio corresponding to the feedback voltage $V_{FB}$. Specifically, as the feedback voltage $V_{FB}$ increases, the duty ratio of the pulse signal $S_{PWM}$ becomes larger.

For example, the PWM 20 includes an oscillator 24 and a PWM comparator 26. The oscillator 24 generates a period voltage $V_{OSC}$ of a triangular wave or sawtooth wave. The PWM comparator 26 compares the feedback voltage $V_{FB}$ with the period voltage $V_{OSC}$, and generates the pulse signal $S_{PWM}$ having a level corresponding to the comparison results. Further, a pulse frequency modulator or the like may be used as the PWM 20. The frequency of the pulse signal $S_{PWM}$ is sufficiently high compared to the PWM drive frequency of the current driver circuit 8, and may be several hundreds kHz (e.g., 600 kHz).

The OVP circuit 70 receives an OVP voltage $V_{OVP}$ according to the output voltage $V_{OUT}$, and performs an over-voltage protection if the output voltage $V_{OUT}$ is higher than an over-voltage threshold.

The standby control unit 50 receives a standby signal STB. The standby control unit 50 stops switching of the switching transistor M1 if the standby signal STB steps down to a low level indicating a standby state. If the standby signal STB stays at the standby state for a predetermined time $\tau_D$, the standby control unit 50 shuts down the current driver circuit 8 and the control circuit 100.

The standby control unit 50 may include a timer circuit to measure the predetermined time $\tau_D$. For example, the timer circuit may be configured to include a capacitor, a charge/discharge circuit which performs charging and/or discharging the capacitor, and a comparator which compares a voltage of the capacitor with a threshold voltage.

In FIG. 3, a capacitor $C_{REG}$ connected to the output terminal P5 of the internal power supply 30, a discharge circuit 52 and a comparator 54 constitute the timer circuit.

The discharge circuit 52 is connected to the output terminal P5 of the internal power supply 30, i.e., the capacitor $C_{REG}$, to extract charges from the capacitor $C_{REG}$. The discharge circuit 52 may be a current source or a resistor. A logic unit 56 sets the internal power supply 30 in a stop state if the standby signal STB steps down to a low level. In the standby state, since the switching of the switching transistor M1 is stopped, no problem occurs even when the internal power supply 30 is stopped. The comparator 54 compares a potential $V_{REG}$ of the output terminal P5 of the internal power supply 30 with a predetermined threshold voltage $V_{TH}$.

According to this timer circuit, an output S3 of the comparator 54 is changed after the predetermined time $\tau_D$ is passed after the standby signal STB steps down from the high level to the low level. The predetermined time $\tau_D$ is calculated by using Eq. 1 below. In Eq. 1, $I_C$ refers to a current value generated by the discharge circuit 52.

$$\tau_D = C_{REG} \times (V_{REG} - V_{TH})/I_C \qquad \text{Eq. 1}$$

As shown in the above Eq. 1, the predetermined time $\tau_D$ may be adjusted according to a capacitance value of the capacitor $C_{REG}$ connected to the output terminal P5.

The logic unit 56 further shuts down the current driver circuit 8 and the control circuit 100 in accordance with the output of the comparator 54.

Figure 4:
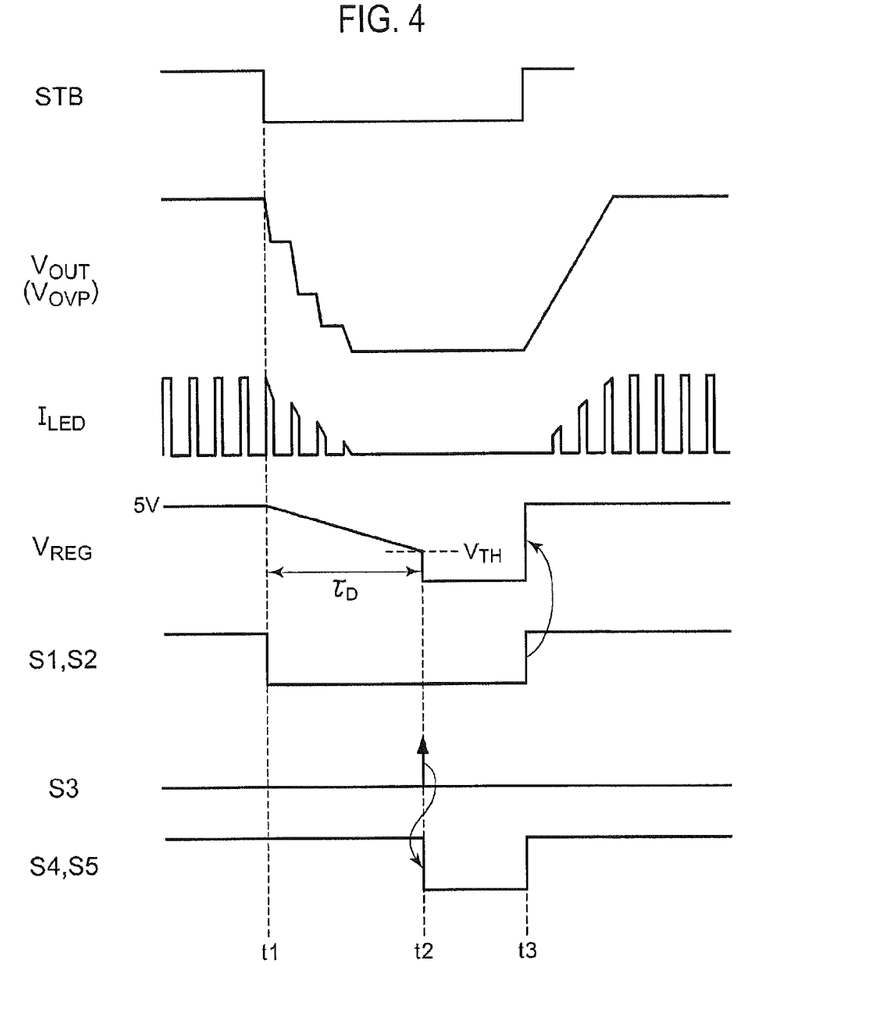
FIG. 4 is a time chart illustrating an operation of a light emitting device of FIG. 3.

Subsequently, an operation of the light emitting device 3 will be described. FIG. 4 is a time chart showing the operation of the light emitting device 3 in FIG. 3.

Prior to time t1, the standby signal STB is set at a high level. At this time, the output voltage $V_{OUT}$ is stabilized to a predetermined level, and the drive current $I_{LED}$ flows in the LED strings 6. When a voltage drop (forward voltage) of the LED strings 6 is $V_F$, the output voltage $V_{OUT}$ corresponds to a combination of the forward voltage of the LED strings 6 $V_F$ and the reference voltage $V_{REF}$.

At the time t1, the standby signal STB steps down to a low level. By this step down, the standby control unit 50 outputs a control signal S1 to fix a gate voltage of the switching transistor M1 output from the driver 28 to the low level. Further, the logic unit 56 outputs a control signal S2 to the internal power supply 30 to set the internal power supply 30 in a stop (shutdown) state.

If the internal power supply 30 is in the stop state, the supply of charges to the capacitor $C_{REG}$ is stopped, and output voltage $V_{REG}$ from the internal power supply 30 decreases with time due to a discharge by the discharge circuit 52. Then, at time t2, after the predetermined time $\tau_D$ has passed from the time t1, the output voltage $V_{REG}$ from the internal power supply 30 drops to a threshold voltage $V_{TH}$, and the output S3 of the comparator 54 is changed. If the output S3 of the comparator 54 is changed, the logic unit 56 outputs a control signal S4 to shut down circuit blocks 19, 50 and 70, and also outputs a control signal S5 to shut down the current driver circuit 8.

By supplying the drive current $I_{LED}$ through the LED strings 6, the output voltage $V_{OUT}$ of the switching power supply 4 decreases gradually. In addition, the drive current $I_{LED}$ also decreases along with the decrease of the output voltage $V_{OUT}$. The output voltage $V_{OUT}$ is gradually decreased to 0 V.

At time t3, the standby signal STB returns to a high level to return to a normal operation state from the standby state. At this time, since the output voltage $V_{OUT}$ is zero, the LED strings 6 do not emit light. The control IC 100 gradually increases the output voltage $V_{OUT}$ in accordance with a predetermined soft-start sequence. With the increase of the output voltage $V_{OUT}$, the drive current ILED also increases.

The operation of the light emitting device 3 has been described so far. According to the light emitting device 3, when returning from the standby state, since the output voltage $V_{OUT}$ is reduced to a voltage level at which the LED strings 6 do not emit light, flickering as described in FIG. 2 is appropriately prevented.

Figure 5:
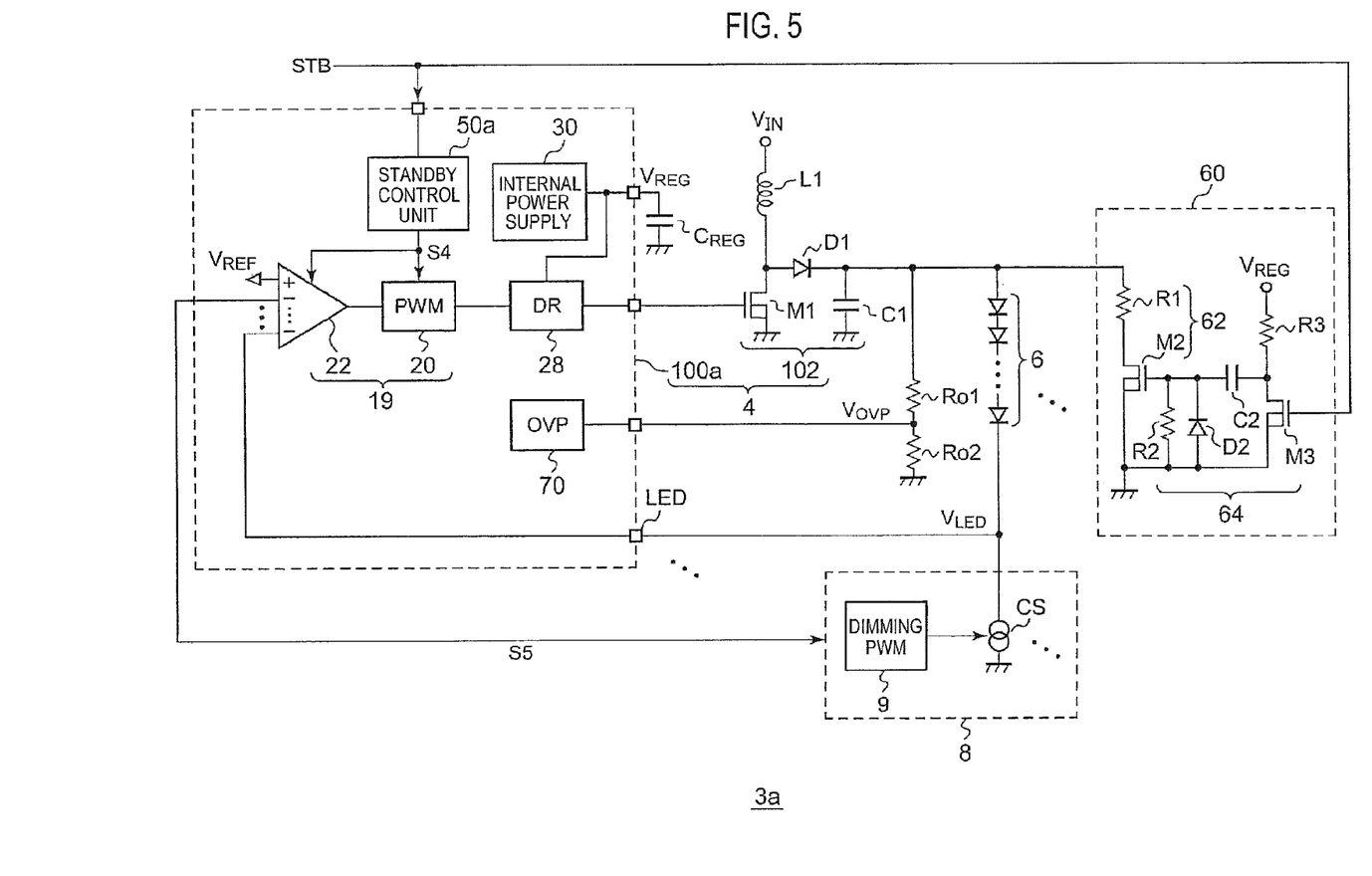
FIG. 5 is a circuit diagram illustrating a configuration of a light emitting device according to some embodiments of the present disclosure.

FIG. 5 is a circuit diagram illustrating a configuration of a light emitting device 3a according to some embodiments of the present disclosure. A basic configuration of a control IC 100a is similar to that of FIG. 1 or FIG. 3, and includes the pulse generating unit 19 and the driver 28. The pulse generating unit 19 generates the pulse signal $S_{PWM}$ whose duty ratio is adjusted such that a detection voltage $V_{LED}$ corresponding to an output voltage $V_{OUT}$ of a switching power supply 4a is equal to a predetermined reference voltage $V_{REF}$. The driver 28 drives the switching transistor M1 based on the pulse signal $S_{PWM}$. A discharge circuit 60 is provided externally of the control IC 100a, and forms a control circuit with the control IC 100a.

The discharge circuit 60 includes a discharge path 62 provided between one end (anode) of each of the LED strings 6 and a ground terminal. In addition, the discharge circuit 60 is configured such that the discharge path 62 is conducted if a standby signal steps down to a low level indicating the standby state. The discharge path 62 includes a resistor R1 and a first transistor M2. An ON state of the first transistor M2 corresponds to the conduction of the discharge path 62.

A first resistor R2, a second resistor R3, a diode D2, a capacitor C2, and a second transistor M3 constitute a gate control circuit 64 which switches ON/OFF of the first transistor M2 based on the standby signal STB. When the standby signal STB steps up to a high level, the second transistor M3 is turned on, and a voltage of a control terminal (gate) of the first transistor M2 is set at a low level to block the discharge path 62. On the other hand, when the standby signal STB steps down to a low level, the second transistor M3 is turned off, and a voltage higher than a threshold voltage between the gate and source of the first transistor M2 is applied to the gate of the first transistor M2, so that the first transistor M2 is turned on to conduct the discharge path 62.

A standby control unit 50a of the control IC 100a shuts down the control IC 100a and the current driver circuit 8 if the standby signal STB steps down to the low level indicating the standby state.

Figure 6:
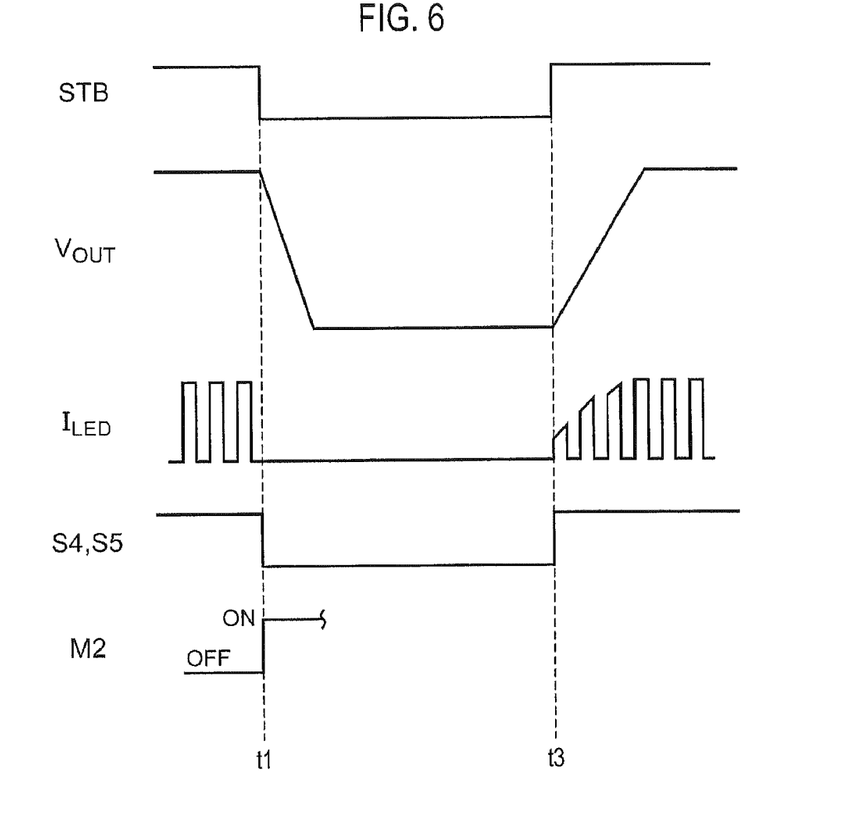
FIG. 6 is a time chart illustrating an operation of the light emitting device of FIG. 5.

Subsequently, an operation of the light emitting device 3a will be described. FIG. 6 is a time chart illustrating the operation of the light emitting device 3a of FIG. 5. At time t1, the standby signal STB is set at a low level to instruct a transition to the standby state. In response thereto, the standby control unit 50a sets the control signals S4 and S5 at a low level to shut down the pulse generating unit 19 and the current driver circuit 8 of the control IC 100a.

Further, if the standby signal STB is set at a low level, the first transistor M2 is turned on, and the output capacitor C1 is discharged through the discharge path 62, so that the output voltage $V_{OUT}$ is reduced.

At time t3, the standby signal STB returns to a high level to instruct a return to a normal operation state from the standby state. At this time, since the output voltage $V_{OUT}$ is zero, the LED strings 6 do not emit light. The control IC 100a gradually increases the output voltage $V_{OUT}$ in accordance with a predetermined soft-start sequence. With the increase of the output voltage $V_{OUT}$, the drive current ILED also increases.

The operation of the light emitting device 3a has been described so far. According to the light emitting device 3a, when returning from the standby state, since the output voltage $V_{OUT}$ is reduced to a voltage level at which the LED strings 6 do not emit light, flickering as described in FIG. 2 is appropriately prevented.

The present disclosure has been described based on the foregoing embodiments. The present disclosure is not limited to these embodiments, and various modifications may be made in each component, each process and combination thereof. The modifications may include below.

The configuration of the timer circuit is not limited to that of FIG. 3, and other configurations may be used. For example, separately from the capacitor $C_{REG}$ and the internal power supply 30, there may be provided a capacitor dedicated to the timer circuit, and a voltage source (charge circuit) charging the capacitor to an initial voltage $V_{INIT}$. In this case, since it is possible to optionally select an initial potential $V_{INIT}$, the predetermined time $\tau_D$ may be set according to the initial voltage $V_{INIT}$ and a capacitance value of the capacitor.

As the timer circuit, a digital counter may be used in addition to using the charge/discharge of the capacitor.

Although a non-isolated switching power supply using an inductor has been described in the embodiments, the present disclosure is also applicable to an insulation switching power supply using a transformer.

Although the electronic apparatus has been described as an application of the light emitting device 3 in the embodiments, the use is not particularly limited thereto, and it can also be used for lighting and the like.

Further, in the embodiments of the present disclosure, setting of high level and low level logic signals for each signal is exemplary, and it can be changed by appropriately inverting the signals using an inverter or the like.

According to an embodiment of the present disclosure, it is possible to suppress the flicker at the time of returning from the standby state.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A control circuit of a switching power supply for supplying a drive voltage to a light emitting element, the control circuit comprising:
    a pulse width modulator configured to generate a pulse signal, wherein a duty ratio of the pulse signal is adjusted such that a detection voltage corresponding to an output voltage of the switching power supply is equal to a predetermined reference voltage;
    a driver configured to drive a switching element of the switching power supply based on the pulse signal; and
    a standby control unit configured to stop driving of the switching element once a predetermined time has passed after a standby signal steps down to a level indicating a standby state, and to shut down the control circuit and a current source.

2. The control circuit of claim 1, further comprising:
    an internal power supply configured to stabilize a voltage generated at an output terminal in an operation state to a predetermined level and to supply the voltage generated at the output terminal to the driver,
    wherein the output terminal of the internal power supply is coupled to a capacitor,
    wherein the standby control unit comprises:
        a logic unit configured to set the internal power supply in a stop state if the standby signal steps down to the level indicating the standby state;
        a discharge circuit coupled to the output terminal of the internal power supply; and
        a comparator configured to compare a potential of the output terminal of the internal power supply with a predetermined threshold voltage, and
    wherein at least a portion of circuit blocks of the control circuit is shut down according to an output of the comparator.

3. A light emitting device comprising:
    a light emitting element;
    a switching power supply configured to supply a drive voltage to one end of the light emitting element; and
    a current driver circuit connected to the other end of the light emitting element, and configured to supply a drive current corresponding to target luminance to the light emitting element,
    wherein the switching power supply comprises:
        an output circuit including a switching element; and
        the control circuit described in claim 1, and configured to drive the switching element.

4. An electronic apparatus comprising:
    a liquid crystal panel; and
    the light emitting device described in claim 3, and provided as a backlight of the liquid crystal panel.

5. A control circuit of a switching power supply for supplying a drive voltage to a light emitting element, the control circuit comprising:
    a pulse width modulator configured to generate a pulse signal, wherein a duty ratio of the pulse signal is adjusted such that a detection voltage corresponding to an output voltage of the switching power supply is equal to a predetermined reference voltage;

a driver configured to drive a switching element of the switching power supply based on the pulse signal;

a discharge circuit including a discharge path provided between one end of the light emitting element and a ground terminal, and configured to conduct the discharge path if a standby signal steps down to a level indicating a standby state; and a standby control unit configured to shut down the control circuit if the standby signal steps down to the level indicating the standby state.

6. The control circuit of claim 5, wherein the discharge circuit is provided externally of a semiconductor substrate on which the pulse width modulator and the standby control unit are formed.

7. The control circuit of claim 5, wherein the discharge circuit comprises:

a first transistor arranged on the discharge path between the one end of the light emitting element and the ground terminal; and a gate control circuit configured to switch the first transistor between on and off according to the standby signal.

8. The control circuit of claim 7, further comprising:

an internal power supply configured to stabilize a voltage generated at an output terminal in an operation state to a predetermined level and to supply the voltage generated at the output terminal to the driver, wherein the output terminal of the internal power supply is coupled to a capacitor, wherein the gate control circuit comprises:

a first resistor and a diode arranged in parallel between a control terminal of the first transistor and the ground terminal;

a second resistor and a second transistor sequentially arranged in series between the output terminal of the internal power supply and the ground terminal; and a capacitor arranged between the control terminal of the first transistor and a connection node of the second resistor and the second transistor, and wherein the standby signal is input to a control terminal of the second transistor.

* * * * *